United States Patent Office 3,144,155
Patented Aug. 11, 1964

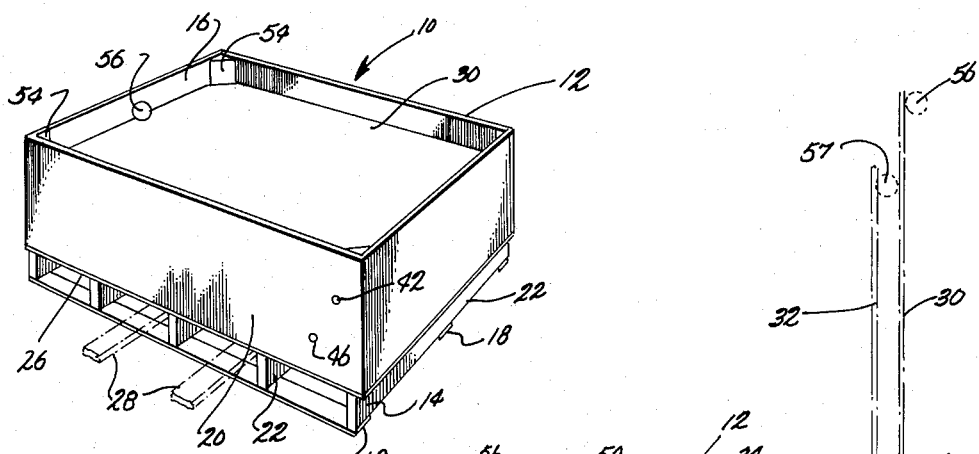
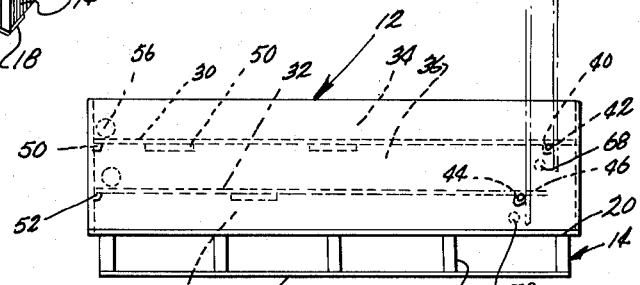
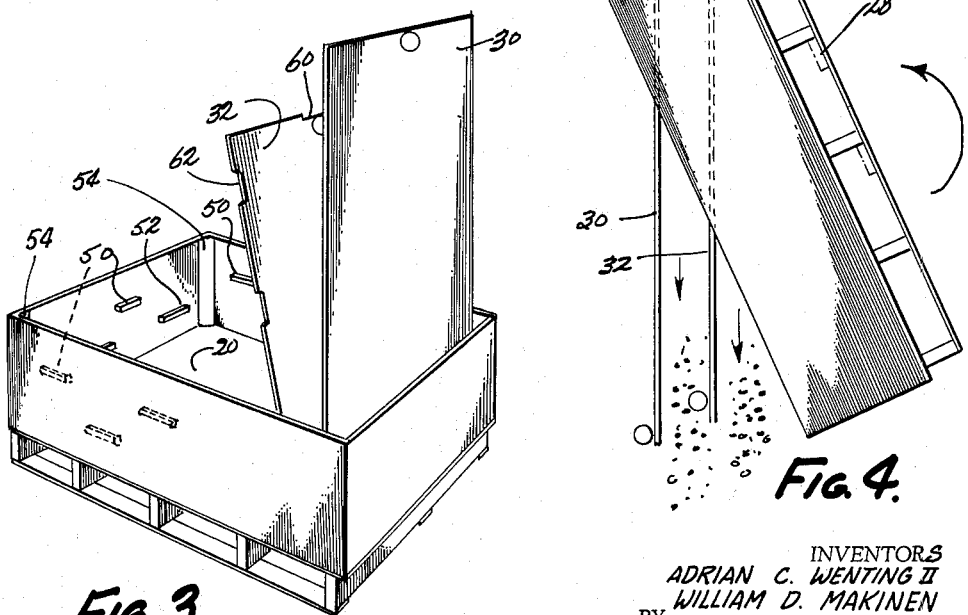

3,144,155
FRUIT LUG
Adrian C. Wenting II, Muskegon, and William D. Makinen, Kaleva, Mich., assignors to Wenting Building and Manufacturing Company, Muskegon, Mich., a partnership of Michigan
Filed Dec. 24, 1962, Ser. No. 246,791
3 Claims. (Cl. 217—40)

This invention relates to a fruit lug, and more particularly to a fruit lug capable of handling the equivalent of many times that of conventional lugs, while retaining even delicate fruit in optimum condition during handling and transportation.

Techniques for handling and transporting delicate picked fruit such as cherries, peaches and the like, from the orchard to the cannery has for decades been accomplished by the use of small, shallow lugs. The conventional lug is approximately 10 inches wide, 20 inches long, and 5 inches deep, i.e., approximately 1000 cubic inches in volume. The depth is normally limited to about 5 to 6 inches because greater depth would cause the lower fruit items to be squashed by the overlying weight. The length is limited to about 20 inches for convenient manual handling. The width is limited to maintain the overall weight of the fruit and lug to a convenient amount for handling. To harvest an orchard of cherries, therefore, requires the use of hundreds and usually thousands of such lugs. They are filled by the pickers, stacked up, lifted by hand from the stack to a tractor drawn wagon, transferred to a truck outside the orchard (or sometimes lifted directly to a truck in the orchard), hauled to the cannery, manually removed from the truck, conveyed inside, and then manually dumped. The initial cost of the lugs, the amount of annual labor and maintenance expenses, and the time consumption are all very great, as is obvious. Moreover, the supply of competent labor to handle the many lugs is often not readily available.

It is therefore a principal object of this invention to provide a large fruit lug that completely eliminates manual handling, both in the orchard and in the cannery, and is capable of handling and transporting fruit in large volumes, yet without damage, even to delicate fruit. The depth of the lug is not limited to about 5 to 6 inches, but rather may be many times that. The length of the lug is not limited to about 20 inches, but rather may be much longer. Neither is the width of the lug limited to about 10 inches. Accordingly, the size of the lug can vary greatly as needed, with any reasonable width, length, or depth. It may, for example, be equivalent to about 40 to 50 conventional lugs for cherries.

It is another object of this invention to provide a fruit lug having all of the above advantageous characteristics, and yet capable of being conveniently filled to any depth without squashing of fruit, of being loaded onto a truck by a conventional lift truck, of being unloaded by a lift truck, and of being dumped by a lift truck or equivalent in the cannery. All of these steps are accomplished without manual handling. The time required is only a small fraction of that previously required.

It is another object of this invention to provide a large fruit lug having a series of pivotal shelves or false bottoms with individual support means for each, allowing easy loading, mechanized handling, and simultaneous unloading of all layers. Each false bottom or shelf can be pivoted upwardly to fill the space therebeneath, and will remain up until manually lowered. The support means for each shelf does not prevent the shelves therebelow from being pivoted up past it. All of the shelves may be simultaneously pivoted when dumping the large lug to thereby allow all of the fruit to be unloaded simultaneously.

These and other objects of this invention will be apparent upon studying the following specification in conjunction with the drawings in which:

FIG. 1 is a perspective view of the novel lug shown with a lift fork in phantom;

FIG. 2 is a side elevational view of one form of the novel lug having two shelves therein, with the shelves being shown lowered in solid lines, and raised in phantom lines;

FIG. 3 is a top perspective view of the inside of the lug with the shelves raised; and FIG. 4 is an elevational view showing the lug being dumped of its contents by a lift truck.

Basically, the inventive fruit lug comprises a casing including a bottom and side walls, a plurality of spaced layer shelves or false bottoms in the casing, each having one end resting on support means and the opposite end pivotally mounted to the casing so that each is individually manually pivotal to enable space thereunder to be filled with fruit, and all are simultaneously pivotal to allow simultaneous emptying of the layered chambers with tipping or tilting of the lug. The supports for each shelf are laterally offset from those thereabove, and the shelves below the uppermost one have cut-out portions to pass the respective support means of the shelves thereabove when pivoted upwardly. Also, each shelf has its pivotal mounting offset slightly towards the opposite end of the lug, with respect to the shelf thereabove, to enable each shelf to move past center when raised to remain in raised position until lowered.

The base of the lug is like a pallet and includes elongated openings of sufficient width to receive the fork of a lift truck to enable the filled lug to be lifted onto a truck bed, removed from the truck bed, and tilted for dumping the layered fruit chambers at the cannery.

Referring now specifically to the drawings, the inventive lug 10 comprises a casing 12 having a bottom preferably in the form of a pallet 14 and four side walls 16 secured together at their ends and to the top of pallet 14.

The pallet 14 includes spaced, parallel stringers 22 covered by a plurality of adjacent boards 20, and having their lower ends secured together by a series of slats 18. Between the stringers are elongated openings 26 of sufficient width and height to receive the fork 28 of a lift truck to enable the entire lug to be lifted, lowered, tilted and the like.

Within the confines of the casing 12, is mounted a plurality of layer shelves 30 and 32. There may be 2, 3, 4 or any number of such shelves. These shelves, together with the bottom 20 of the casing, form a series of chambers 34, 36 and 38 of controlled depth for retaining fruit. Each of the shelves is pivotally mounted to the casing and more specifically to the walls thereof at one end of the shelf. Thus, shelf 30 includes a series of brackets 40 fastened to the bottom of the shelf and bent around a transverse rod 42 which passes through the side walls of the casing and is secured by nuts. The rod is therefore removable. Likewise, shelf 32 includes a bracket 44 fastened to pivotal rod 46 connected to the side walls. At the opposite ends of the shelves, and preferably along the central side portions thereof are supports 50 and 52 respectively for shelves 30 and 32. In a wooden casing these are small wooden blocks secured to the walls of the casing to support each shelf independently of the other shelves and independently of the fruit thereunder. Preferably, the bottom surface of each block is rounded to prevent fruit damage. Also, preferably the corners of the casing are filled with fillets 54 to increase the strength and also prevent squashing of fruit in the corners.

Each of the shelves preferably has a knob 56 at its end opposite the pivotally supported end to enable the shelves each be manually pivoted around the support rod to a raised position like that illustrated in phantom in FIG. 2. The pivotal mounting of each shelf is off-set towards the unmounted end with respect to the shelf thereabove, so that when the shelves are raised manually to fill the chambers, they remain in this raised position until purposely lowered one by one as the chambers are filled.

The support blocks for the respective shelf layers are other than vertically aligned, i.e., they are offset horizontally with respect to each other, as shown for example in FIG. 3. All shelves below the uppermost shelf have cut-out portions in the end as at 60 (FIG. 3) and the sides as at 62 to correspond with support blocks for shelves above it, and thereby to enable the lower shelves to pass all supports for shelves thereabove as it is pivoted upwardly. This enables all shelves to be pivoted freely and independently.

*Use*

To use the novel structure for hauling fruit such as cherries, peaches, etc., any number of shelves 30 and 32, etc., are pivotally supported on rods 42, 46 by inserting the rods through the walls of the casing and fastening the nuts thereon. If desired, extra openings, e.g., 68 and 70 (FIG. 2) may be provided so that the number of shelves and their spacing can be varied with respect to each other. Each lug can be of any desired size since the depth is readily controlled and the over-all weight is not determinative of its size other than to keep it within the limits of the capabilities of a conventional or modified lift truck or other hoisting means.

To fill the structure, all shelves are first pivoted upwardly as in FIG. 3 so that fruit may be placed on the bottom 20 on top of the integral pallet 14. The bottom chamber 38 is then filled up to the level of support means or blocks 52. Then, the lowermost shelf 32 is pivoted downwardly by hand using its knob 57. Shelf 32 may be easily lowered without interference with the supports 50 since the cut-outs 60 and 62 allow the shelf to pass the support blocks. After chamber 36 is filled, the uppermost shelf 30 (in the form of the invention illustrated) is manually lowered and chamber 34 is filled. It will be seen that although a large amount of delicate fruit is contained in the lug, each shelf is independently supported so that the fruit thereon does not apply pressure to the fruit therebeneath.

To hoist the lug, a lift fork 28 is inserted in the elongated slots 26 on the pallet bottom 14. Several of such lugs are lifted onto a truck in a few minutes, thereby quickly and easily loading the truck with the equivalent of a few hundred conventional lugs. These are then hauled to the cannery. At the cannery, a fork lift truck may merely unload them and take them to the position to be dumped. Then, the fork lift or any other equivalent device tips the lug as shown in FIG. 4 so that all of the shelves pivot out of the casing to allow all of the fruit to be dumped simultaneously, yet without damage. The entire dumping operation only assumes a few seconds. Then, the lug is uprighted and hauled back to the orchard for reuse.

In the fall of the year, the lugs can also be used for firm fruit such as apples, merely by removing the rods and shelves.

Various additional advantages not specifically mentioned above may occur to those in the art upon studying the invention herein described. Also, various obvious modifications within the principles of this invention may readily occur to those in the art upon studying the exemplary form illustrated. These obvious modifications are deemed to be part of this invention, which is to be limited only by the scope of the appended claims and the reasonably equivalent structures to those defined therein.

We claim:
1. A fruit lug comprising: a fruit retaining casing including a bottom, fruit retention side walls; a plurality of vertically spaced fruit supporting shelves in said casing, the lowermost shelf being vertically spaced from said bottom; each of said shelves substantially filling the entire area between the walls and cooperative with the surrounding walls to form a fruit retention zone; each of said shelves having pivot means on one end of the shelf extending between oppositely positioned casing walls to be pivotally mounted to said casing; shelf support means in said casing under the end of each of said shelves opposite its pivotal mount to support articles on the shelf without applying pressure to the fruit therebeneath; each of said shelves being configurated to pivot freely past the support means for the shelves thereabove for exposing the space thereunder; all of said shelves being pivotal upon rotation and inversion of the casing to enable fruit in the lug to be dumped; a support base joined to said casing beneath said casing bottom; said support base having dumper receiving and retaining means to allow said casing to be rotated and inverted for dumping, including openings to receive the fork of a dumping lift; said openings being parallel to the pivotal axis of said shelves and having side wall elements to control against sideways sliding of the casing on the fork when rotated and inverted, and having bottom means attached to said elements to prevent said casing from falling off the fork when inverted.

2. The lug in claim 1 wherein said pivot means for each of said shelves is offset horizontally from the one thereabove toward the opposite end of the casing.

3. The lug in claim 1 wherein said pivot means for each of said shelves is offset horizontally from the one thereabove toward the opposite end of the casing; wherein said shelf support means are other than vertically aligned, and said shelves each having recessed edge portions to pass the shelf support means for the shelves thereabove.

References Cited in the file of this patent

UNITED STATES PATENTS

| | | |
|---|---|---|
| 75,243 | Caldwell | Mar. 10, 1868 |
| 2,068,812 | Miller | Jan. 26, 1937 |
| 2,564,940 | Weber | Aug. 21, 1951 |
| 3,064,845 | Maxwell | Nov. 20, 1962 |
| 3,072,278 | Baxter et al. | Jan. 8, 1963 |

FOREIGN PATENTS

| | | |
|---|---|---|
| 850,798 | Great Britain | Oct. 5, 1960 |